E. Forney.
Harrow.

Nº 73792. Patented Jan. 28, 1868

Emanuel Forney
by A. Pollok
atty

United States Patent Office.

EMANUEL FORNEY, OF FISHERSVILLE, PENNSYLVANIA.

Letters Patent No. 73,792, dated January 28, 1868.

IMPROVEMENT IN HARROWS.

The Schedule referred to in these Letters Patent and making part of the same.

TO WHOM IT MAY CONCERN:

Be it known that I, EMANUEL FORNEY, of Fishersville, in the county of Dauphin, and State of Pennsylvania, have invented certain new and useful Improvements in Harrows; and I hereby declare the following to be a full, clear, and exact description of the same, reference being had to the accompanying drawings, in which—

This invention relates to that class of harrows in which the teeth are set in a frame so mounted or attached to the main frame of the machine as to be capable of a rotary movement.

The frame which carries the teeth is usually pivoted to the under side of the body of the machine, and is slightly tilted, or set at an angle thereto, so that the teeth on one side will penetrate the earth to a greater depth than those on the other; and by this means, i. e., the resistance resulting from the unequal penetration of the teeth, when the harrow is in motion, the pivoted frame or frames will, as is well known, be caused to revolve.

The object of my invention is to so construct and arrange the rotary frames as to prevent, as far as possible, all danger of their becoming clogged and prevented from revolving, a defect to which ordinary harrows of this class are extremely liable; and my object, furthermore, is to produce a harrow composed of two or more pairs of these revolving frames, which will effectually, and at one operation, break or act upon all the ground passed over by the machine. This is a result which, to my knowledge, has not been accomplished heretofore; for, in ordinary revolving harrows, the teeth are set in circular or other ordinary frames, which, from the nature of their construction, are necessarily so arranged that, between any one pair of the frames, there must be left a small strip of earth which will not be touched by the teeth; and, for this reason, such harrows have usually a third circular frame, placed in advance or in rear of, and opposite to the interval between the other two, so as to cover the ground which cannot be acted on by them.

Under my invention, each revolving frame is composed of a series of arms, radiating from a common centre or axis, in which arms the harrow-teeth are set or secured in any suitable manner. Two or more of such frames are pivoted to the body of the harrow, being set at an angle thereto, so as to secure their revolution when the harrow is in motion, and are so arranged that the arms of the one will mesh with or overlap the arms of the other. By this arrangement of the frames, the teeth are caused to break all the ground covered by the harrow; and, moreover, as the arms of the frames may be considered cogs which mesh with one another, it will be seen that in event of the clogging and consequent retarded rotary movement of one frame, the arms of the one adjoining will engage or strike against those of the clogged frame, and will thus force the latter to continue its revolution, and enable it to free itself from any encumbrance.

In order that these and other features of my invention may be fully understood, I will now proceed to describe the manner in which the same is or may be carried into effect, by reference to the accompanying drawings.

Figure 1:
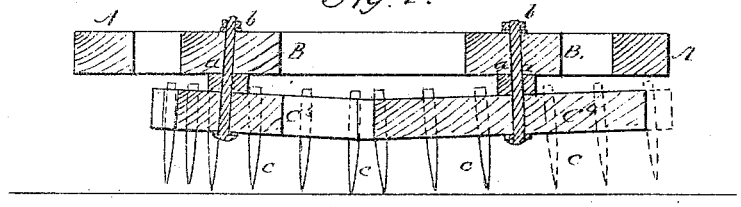
Figure 1 is a vertical section through the harrow, on the line $x\ x$, fig. 3.
Figure 2:
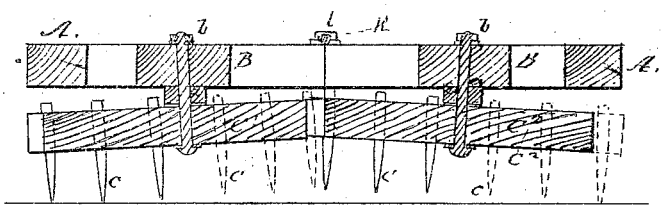
Figure 2 is a like section on the line $y\ y$ of the same figure.
Figure 3:
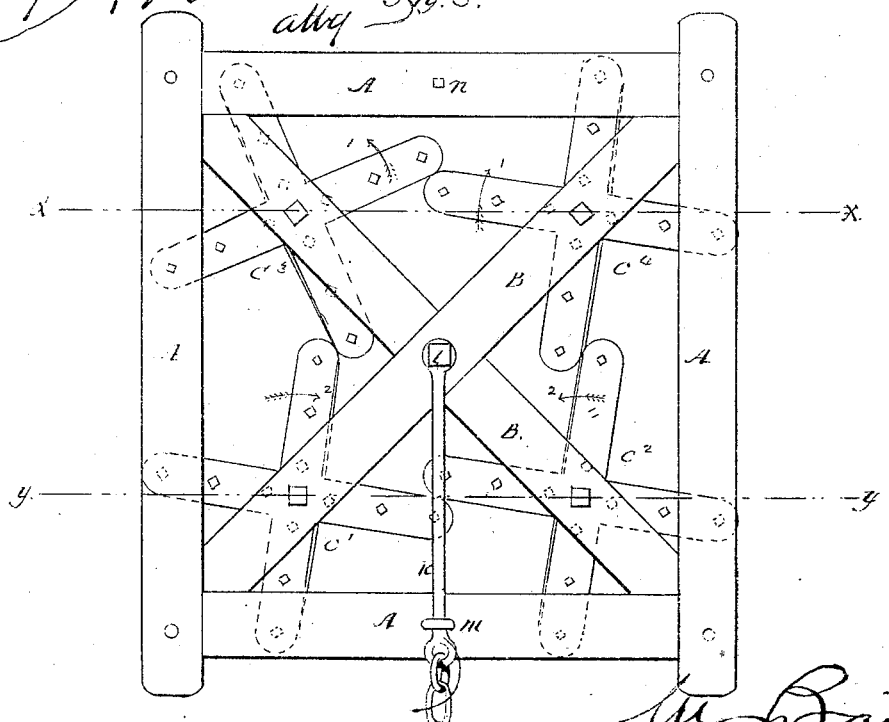
Figure 3 is a top or plan view of a harrow constructed in accordance with my invention.

The harrow-frame, as represented in fig. 3, consists of the pieces A, forming the four sides of a square or parallelogram, and the diagonal cross-pieces or braces B, which not only serve to steady and strengthen the frame A, but also to support or hold in position the smaller rotary frames which carry the harrow-teeth. These frames, designated in the drawings as $C^1$, $C^2$, $C^3$, and $C^4$, are pivoted to the under side of the cross-pieces B, as indicated in figs. 1 and 2, by means of bolts and nuts, $a\ b$, or in any other suitable manner. Each frame consists of two bars, one placed at about right angles across the other, so as to form four arms radiating from the common centre or axis $a$. In these arms the harrow-teeth, $c$, are set and secured by suitable means; and it will, of course, be understood that the number of the radial arms may be more or less than I have represented in the drawings.

Each frame C, as shown in the drawings, is set at an angle to the main frame A, so that the teeth upon one side of each frame may penetrate the earth to a greater depth than those upon the other. In fig. 1, for instance, which represents a section through one pair of revolving frames, the set of the frames is such as to depress that portion of each which is nearest the centre line of the harrow, the opposite part of the frame being correspondingly elevated. The teeth toward the middle of the harrow therefore enter the earth to a greater distance than those toward the exterior, and when the harrow is being dragged, the unequal resistance thus offered by the teeth will cause the frames to revolve in the direction indicated by the arrows 1 1.

Confining attention to the pair of revolving frames represented in fig. 1, and on the line $x\,x$, fig. 3, it will be seen that the arms of the frame $C^3$ gear with or overlap those of the frame $C^4$, so that all the ground between the two is subjected to the action of the harrow-teeth. And, moreover, if at any time one of the frames—for instance $C^4$—should become clogged, and cease to revolve, the arms of the other, in their revolution, would engage with or strike against the arms of the opposite frame, and so force the latter to continue its revolution.

Two or more of these revolving frames may be arranged as described, to operate in connection with each other. I prefer, however, the arrangement of the two pairs shown in fig. 3. The front pair, as seen in fig. 2, is tilted or set at such an angle with respect to the frame A, that the arms of each frame are at the greatest distance from the ground when they approach the centre line of the harrow. The rear pair, on the contrary, is tilted, in an opposite direction, as represented in fig. 1. These revolving frames are so mounted in the machine, that the arms of any one frame will engage or mesh with the arms of the two adjoining. The frame $C^1$ thus meshes with $C^2$ and $C^3$, $C^4$ with $C^3$ and $C^2$, and so on.

On account of the different set or tilting of the frames, the front pair, $C^1\,C^2$, will revolve in the direction indicated by the arrows 2 2, while the pair in rear will revolve in an opposite direction, as indicated by the arrows 1 1. The frames may thus be considered to be a system of cog-wheels gearing with each other, and, consequently, if the rotation of any one of the frames should for any reason become clogged or impeded, such frame will nevertheless be forced to continue its revolution, by the combined action of the remaining frames.

It will be seen that every portion of the ground covered by the harrow will be acted on by the teeth; and the tilting of the frames represented in the drawings has this further advantage, that the earth will not be thrown up unevenly, but will, by the action of the teeth of the respective frames, be left comparatively level. Three or more pairs of these frames may be employed, if desired, being arranged with facility to operate in connection with each other in the manner above specified.

The harrow is provided upon its top with a bar or stout iron rod K, in each end of which is formed an eye or perforation. One end of the bar is attached to the harrow, at about the centre of the same, by means of a bolt and nut $l$; the other passes through an eye-bolt which passes through the frame of the harrow, and is held in place by means of a nut screwed upon its lower end. To the ring or eye formed in the forward end of the bar K, is attached the chain or other means by which the harrow is dragged. By unscrewing the nut $l$, and also the nut upon the lower end of the eye-bolt $m$, the latter may be drawn out from the frame A, and the position of the bar K can be turned so as to reverse its position, the eye-bolt $m$ fitting in a hole or perforation, $n$, formed in the opposite side of the frame; and thus, when the harrow-teeth become worn in front, instead of being compelled to resharpen the teeth, as is usually the case, the drag-bar K may be reversed, so as to bring the wear upon the opposite side of the teeth, the pair of frames $C^3\,C^4$ becoming in such case the front pair.

Having now described my invention, and the manner in which the same is or may be carried into effect, what I claim, and desire to secure by Letters Patent, is—

1. The combination, with the main frame of the harrow, of two or more sets or pairs of revolving frames or arms for carrying the teeth, tilted or set at angles to the main frame, in the manner described, and arranged to gear or mesh with each other, substantially as herein shown, and for the purposes set forth.

2. The combination, with the harrow-frame, of the reversible drag-bar and eye-bolt, or equivalent means for holding the said bar in position, under the arrangement and for operation as herein shown and specified.

In testimony whereof, I have signed my name to this specification before two subscribing witnesses.

EMANUEL FORNEY.

Witnesses:
M. BAILEY,
JOHN T. HOFFMAN.